United States Patent
Casey-Cholakis

(10) Patent No.: US 6,577,986 B1
(45) Date of Patent: Jun. 10, 2003

(54) METHOD AND SYSTEM FOR DETERMINING MEASUREMENT REPEATABILITY AND REPRODUCIBILITY

(75) Inventor: Evangeline H. Casey-Cholakis, Troy, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/467,598

(22) Filed: Dec. 20, 1999

(51) Int. Cl.$^7$ ............... G06F 101/14; G06F 13/00; G06F 17/18
(52) U.S. Cl. .................. 702/179; 714/1; 714/819
(58) Field of Search ............... 702/81, 82, 84, 702/45, 47, 50, 120, 121, 127, 128, 130, 179; 714/819–822

(56) References Cited

U.S. PATENT DOCUMENTS

| | | | | |
|---|---|---|---|---|
| 5,402,333 A | * | 3/1995 | Cardner | 700/31 |
| 5,625,170 A | | 4/1997 | Poris | 177/50 |
| 5,893,051 A | * | 4/1999 | Tomohiro | 702/130 |
| 5,899,962 A | * | 5/1999 | Louwagie et al. | 702/138 |
| 5,960,085 A | * | 9/1999 | de la Huerga | 340/5.61 |
| 6,067,584 A | * | 5/2000 | Hayles et al. | 710/10 |
| 6,108,800 A | * | 8/2000 | Asawa | 714/47 |
| 6,161,101 A | * | 12/2000 | Guinta | 706/45 |
| 6,363,330 B1 | * | 3/2002 | Alag et al. | 702/132 |

OTHER PUBLICATIONS http://www.sgcorp.com/gauge_r&r.htm, "Gauge R&R", (No Date).*
http://www.qualitynews.com/msa.htm "Gauge R&R Success", (No Date).*
http://www.interlog.com/~gagechek/randr.html "GageChek", (1991–2002).*
Do You Trust Your Data—Or Why Is Gauge R&R Inportant, Richard Monkhouse, spctraining.co.uk, Quality Today 1996.
Process Control, A Structured Approach to Rapid Process Development and Control, Raymond Augustin, Jan. 2000.

* cited by examiner

Primary Examiner—Marc S. Hoff
Assistant Examiner—Mary Catherine Baran

(57) ABSTRACT

An exemplary embodiment of the invention is a method for determining variability in a measurement system using a measurement repeatability and reproducibility system coupled to a plurality of respondent systems by a network. The method includes determining a definition of items to be measured. The definition of the items to be measured are provided to the respondent systems. Measurements are provided from the respondent systems to the measurement repeatability and reproducibility system. The measurement repeatability and reproducibility system determines one of measurement repeatability and measurement reproducibility in response to the measurements.

18 Claims, 2 Drawing Sheets

FIG. 3

| SCENARIO | SHOULD PATIENT BE DIRECTED TO EMERGENCY ROOM? | IS A SPECIALIST NEEDED? | IS A X-RAY NEEDED? | | |
|---|---|---|---|---|---|
| A 26 YEAR OLD MAN COMPLAINS OF DULL PAIN IN ANKLE | ◯ YES  ◯ NO | | | | |
| ... | | | | | |

NAME: JOHN DOE  
YEARS OF EXPERIENCE: 5  
LOCATION: COUNTY HOSPITAL

METHOD AND SYSTEM FOR DETERMINING MEASUREMENT REPEATABILITY AND REPRODUCIBILITY

BACKGROUND OF THE INVENTION

The invention relates generally to a method and system for determining measurement repeatability and reproducibility and in particular to a method and system for determining measurement repeatability and reproducibility using computer systems connected by a network. In determining error in a product, process, system, etc., the degree of error is often detected using a measurement system. Unfortunately, all measurement systems have some degree of variability. This variability may be expressed as measurement repeatability and reproducibility. Measurement repeatability is variation obtained when one measurer measures the same condition repeatedly. Measurement reproducibility is variation obtained when multiple measurers measure the same condition. It is beneficial to minimize measurement repeatability and measurement reproducibility so that measurement accuracy is maximized. Currently, determining measurement repeatability and reproducibility in certain applications is difficult. Accordingly, there is a need in the art for a method and system for facilitating determination of measurement repeatability and reproducibility.

BRIEF SUMMARY OF THE INVENTION

An exemplary embodiment of the invention is a method for determining variability in a measurement system using a measurement repeatability and reproducibility system coupled to a plurality of respondent systems by a network. The method includes determining a definition of items to be measured. The definition of the items to be measured is provided to the respondent systems. Measurements are provided from the respondent systems to the measurement repeatability and reproducibility system. The measurement repeatability and reproducibility system determines one of measurement repeatability and measurement reproducibility in response to the measurements.

BRIEF DESCRIPTION OF THE DRAWINGS

FIG. 3 depicts a user interface in an exemplary embodiment of the invention.

DETAILED DESCRIPTION OF THE INVENTION

Figure 1:
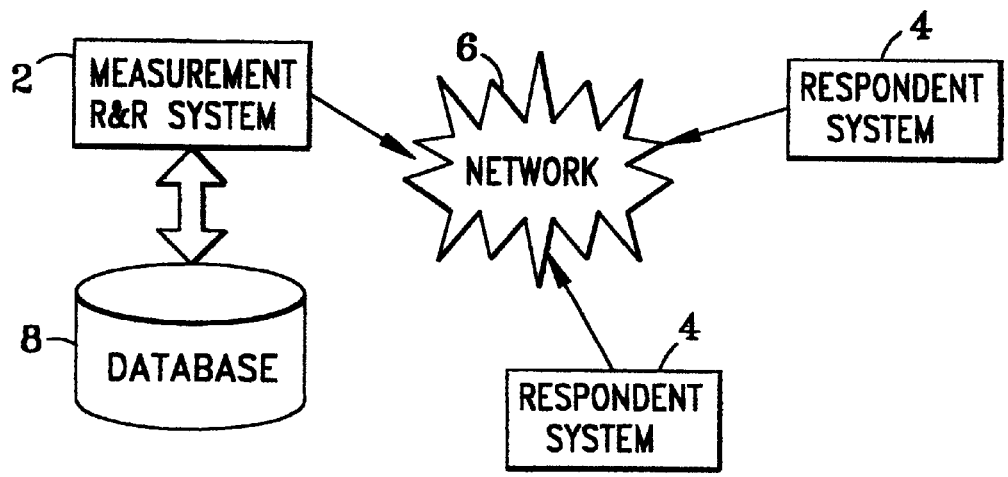
FIG. 1 is a block diagram of a system for determining measurement repeatability and reproducibility.

FIG. 1 is a block diagram of a system in an exemplary embodiment of the invention. As used herein, measurement repeatability and reproducibility may refer to gauges that measure continuous variables (e.g., pressure gauge) or measurement devices that record discrete attributes (e.g., presence or absence of a compound). Thus, measurement repeatability and reproducibility includes, but is not limited to, gauge repeatability and reproducibility and attribute repeatability and reproducibility.

The system shown in FIG. 1 includes a measurement repeatability and reproducibility (R&R) system 2 coupled to a plurality of respondent systems 4 over a network 6. The network 6 may be any type of known network including a local area network (LAN), wide area network (WAN), global network (e.g., Internet), an intranet (e.g., company internal network), etc. The measurement repeatability and reproducibility system 2 may be implemented using a general-purpose computer executing a computer program for carrying out the process described herein. Associated with the measurement repeatability and reproducibility system 2 is a memory device 8 which may be part of the measurement repeatability and reproducibility system 2 or a separate memory device accessible by the measurement repeatability and reproducibility system 2. The memory device 8 may store a database of measurements received from the respondent systems 4. The measurement repeatability and reproducibility system 2 acts as a server for the multiple respondent systems 4 that act as clients. Similarly, respondent systems 4 may be implemented using general-purpose computers executing a computer program for carrying out the process described herein. Respondent systems 4 access the measurement repeatability and reproducibility system 2 over the network 6 using known user interface applications (e.g., web browsers). Users at the respondent systems 4 interact with the measurement repeatability and reproducibility system 2 over network 6 to perform a number of functions which are described in detail herein.

Figure 2:
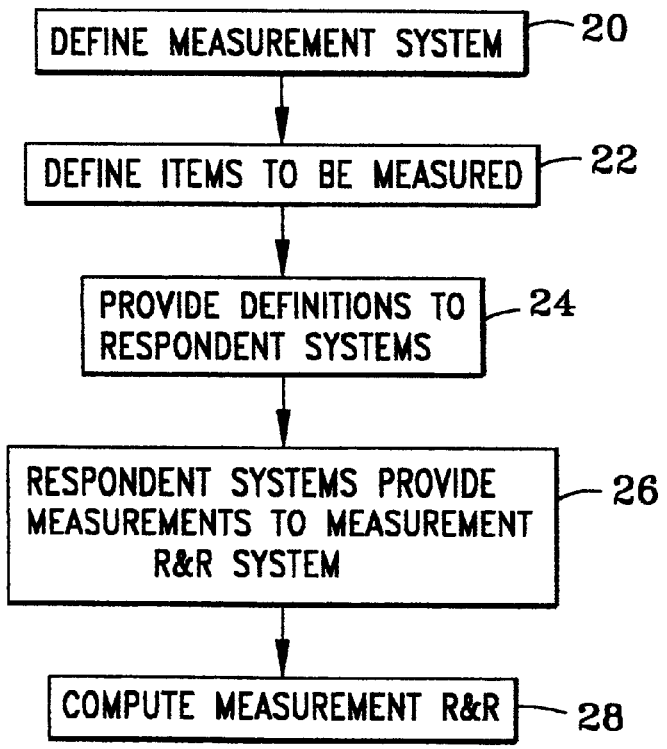
FIG. 2 is a flowchart of a method for determining measurement repeatability and reproducibility.

FIG. 2 is a flowchart of a method for determining measurement repeatability and reproducibility in an exemplary embodiment of the invention. At step 20, a measurement system is defined. The measurement system is the system for which the measurement repeatability and reproducibility is to be determined. The measurement system may be a measurement device (such as a ruler, a caliper, etc.) or may be individuals (such as decision makers). Once the measurement system is defined, the item or items to be measured are defined at step 22. The items to be measured may be physical objects (e.g., respondents are to measure an object with a ruler) or the items to be measured may be hypothetical scenario (e.g., a decision maker must render a decision based on the hypothetical scenario). Defining the measurement system and the items to be measured is typically performed by one or more individuals who have initiated the measurement repeatability and reproducibility study and have access to measurement repeatability and reproducibility system 2.

Once the measurement system and the items to be measured are determined, a description of the measurement system and a description of the items to be measured are provided to the respondent systems 4 over network 6 at step 24. For example, if the measurement system is a newly developed set of calipers, the respondent systems are instructed to measure some predetermined object (e.g., an object having a known thickness) using the newly developed calipers. In a non-physical example, the measurement system includes decision makers and individuals using the respondent systems 4 act as the decision makers. In the non-physical example, the item to be measured may be a series of questions to which the decision maker must respond. The answers to the questions are the measurements. The respondent systems 4 may access the description of the measurement system and/or the description of the items to be measured by connecting to the measurement repeatability and reproducibility system 2 using known user interface applications such as web browsers.

Once the respondent systems 4 have received the definition of the measurement system and/or the items to be measured, individuals obtain the measurements. The measurements may be physical dimensions in the physical example described above or answers to questions in the non-physical example described above. Once the measurements have been generated, the measurements are transferred from the respondent systems 4 to the measurement repeatability and reproducibility system 2 over network 6 as shown in step 26. This provides measurements from multiple sources that are used to compute the measurement repeatability and reproducibility.

Once the measurements have been received at the measurement repeatability and reproducibility system 2, the measurement repeatability and reproducibility system computes the measurement repeatability and reproducibility for the measurement system based on conventional mathematical operations as shown at step 28. Measurement repeatability and reproducibility may be computed as a single value or measurement repeatability may be computed as a single value and measurement reproducibility may be computed as a single value. The separate repeatability measure and separate reproducibility measure are helpful in determining flaws in the measurement system. Regardless of the technique used, determining measurement repeatability and reproducibility provides an indication of variability in the measurement system. Knowing the variability in measurement system can be useful in evaluating measurements or improving the measurement system.

An exemplary implementation of the invention will now be described. In an exemplary embodiment of the invention, the system of FIG. 1 is used to determine measurement repeatability and reproducibility for a measurement system made up of individual decision makers. These decision makers (i.e., the measurement system) are provided with a series of questions (i.e., items to be measured) and their responses (i.e., the measurements) are used to determine measurement repeatability and reproducibility for the multiple individuals. FIG. 3 depicts an exemplary questionnaire which may be accessed by multiple respondent systems 4. As described above, the respondent systems 4 may interface with the measurement repeatability and reproducibility system 2 through a user interface application such as a web browser. The questionnaire includes a number fields for entry of respondent information such as name, location, years of experience, etc. These factors allow the responses to the questionnaire to be sorted into reports indicating measurement repeatability and reproducibility based on geographic region, years of experience of the decision maker, question, etc. It is understood that a variety of fields may be used depending on the application. The questionnaire shown in FIG. 3 presents a number of questions relating to hospital admittance decisions. For each question, the respondent selects a response using an input peripheral such as a mouse. When the questionnaire is completed, the answers (i.e., the measurements) are provided to the measurement repeatability and reproducibility system 2 over network 6. The answers may be saved in memory device 8 and used to subsequently generate reports related to measurement repeatability and reproducibility. The measurement repeatability and reproducibility system 2 then computes the measurement repeatability and reproducibility for all the respondents (i.e., the measurement system) to determine variability in the measurement system. Combined measurement repeatability and reproducibility may be computed as a single value or separate values may be determined for measurement repeatability and measurement reproducibility.

As noted above, reports reflecting measurement repeatability and reproducibility can be generated. For example, it may be revealed that the measurement system shows wide variability in handling certain types of situations (e.g., child related injuries). This indicates that further training of the respondents in this area is necessary. The invention is not limited to the examples discussed herein and may be applied to measurement systems and items to be measured not disclosed herein.

In addition, users at respondent systems 4 can contact the measurement repeatability and reproducibility system 2 and obtain reports concerning measurement repeatability and reproducibility immediately upon submitting measurements. Access to information from multiple respondent systems 4 can be controlled by assigning users varying levels of access. The measurement repeatability and reproducibility system 2 can control access by using user identifications and passwords. Users may have global access which allows the user to view measurement repeatability and reproducibility for all respondents, site access which allows the user to view measurement repeatability and reproducibility for a site or individual access allows the user to view measurement repeatability and reproducibility his or her own measurements. It is understood that other levels of access may be used beyond those described herein.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. The method of determining variability in a measurement system using a measurement repeatability and reproducibility system coupled to a plurality of respondent systems by a network, the method comprising:

determining a definition of an item to be measured;

providing the respondent systems the definition of an item to be measured;

receiving at the measurement repeatability and reproductibility system measurements from the plurality of respondent systems;

determining at the measurement repeatability and reproducibility system measurement repeatability indicative of variation obtained when one measure measures the same condition repeatedly and measurement reproductibility indicative of variation obtained when multiple measures measure the same condition in response to measurements;

determining a definition of a measurement system; and providing the definition of the measurement system to the respondent systems.

2. The method of claim 1 wherein:

said determining measurement repeatability and measurement reproducibility includes determining a single value for measurement repeatability and a single value for measurement reproducibility.

3. The method of claim 1 wherein:

said determining measurement repeatability and measurement reproducibility includes determining a single value for measurement repeatability and measurement reproducibility.

4. The method of claim 1 wherein:

said item to be measured is a series of questions to be answered.

5. The method of claim 1 further comprising:

providing the respondent systems with access to said f measurement repeatability and measurement reproductibility.

6. The method of claim 5 further comprising:

controlling said access to said measurement repeatability and measurement reproductibility.

7. A system for determining variability in a measurement system, the system comprising:

a measurement repeatability and reproducibility system for providing a definition of an item to be measured a plurality of respondent systems coupled to said measurement repeatability and reproducibility system by a network, said respondent systems receiving the definition of an item to be measured;

said respondent systems providing measurements to said measurement repeatability and reproducibility system;

said measurement repeatability and reproducibility system determining measurement repeatability indicative of variation obtained when one measurer measures the same condition repeatedly and measurement reproducibility indicative of variation obtained when multiple measurers measure the same condition in response to the measurements;

wherein said measurement repeatability and reproducibility system provides a definition of the measurement system to the respondent systems.

8. The system of claim 7 wherein:

said measurement repeatability and reproducibility system determining measurement repeatability and measurement reproducibility includes determining a single value for measurement repeatability and a single value for measurement reproducibility.

9. The system of claim 7 wherein:

said measurement repeatability and reproducibility system determining measurement repeatability and measurement reproducibility includes determining a single value for measurement repeatability and measurement reproducibility.

10. The system of claim 7 wherein:

said item to be measured is a series of questions to be answered.

11. The system of claim 7 wherein:

said respondent systems have access to said measurement repeatability and measurement reproducibility through said measurement repeatability and reproducibility system.

12. The system of claim 11 wherein:

said measurement repeatability and reproducibility system controls said access to said measurement repeatability and measurement reproducibility.

13. A storage medium encoded with machine-readable computer program code for determining variability in a measurement system using a measurement repeatability and reproducibility system coupled to a plurality of respondent systems by a network, the storage medium including instructions for causing the measurement repeatability and reproducibility system to implement a method comprising:

providing the respondent systems a definition of an item to be measured;

receiving measurements from the plurality of respondent systems; and determining measurement repeatability indicative of variation obtained when one measurer measures the same condition repeatedly and measurement reproducibility indicative of variation obtained when multiple measurers measure the same condition in response to the measurements;

providing a definition of the measurement system to the respondent systems.

14. The storage medium of claim 13 wherein:

said determining measurement repeatability and measurement reproducibility includes determining a single value for measurement repeatability and a single value for measurement reproducibility.

15. The storage medium of claim 13 wherein:

said determining measurement repeatability and measurement reproducibility includes determining a single value for measurement repeatability and measurement reproducibility.

16. The storage medium of claim 13 wherein:

said item to be measured is a series of questions to be answered.

17. The storage medium of claim 13 further comprising instructions for causing the measurement repeatability and reproducibility system to implement:

providing the respondent systems with access to said f measurement repeatability and measurement reproducibility.

18. The storage medium of claim 17 further comprising instructions for causing the measurement repeatability and reproducibility system implement:

controlling said access to said measurement repeatability and measurement reproducibility.

* * * * *